K. TORNBERG.
ARC LIGHT ELECTRODE.
APPLICATION FILED MAR. 13, 1916.

1,240,628.

Patented Sept. 18, 1917.

Inventor:
Knut Tornberg,
by Albert G. Davis
His Attorney.

UNITED STATES PATENT OFFICE.

KNUT TORNBERG, OF LYNN, MASSACHUSETTS, ASSIGNOR TO GENERAL ELECTRIC COMPANY, A CORPORATION OF NEW YORK.

ARC-LIGHT ELECTRODE.

1,240,628.   Specification of Letters Patent.   Patented Sept. 18, 1917.

Application filed March 13, 1916. Serial No. 83,764.

*To all whom it may concern:*

Be it known that I, KNUT TORNBERG, a citizen of the United States, residing at Lynn, in the county of Essex, State of Massachusetts, have invented certain new and useful Improvements in Arc-Light Electrodes, of which the following is a specification.

My present invention has reference to improvements in luminous arc electrodes designed, primarily, to operate with direct current as lower cathodes in conjunction with non-consuming upper anodes, although they may also be used both as cathodes and anodes, or may be used as lower cathodes in conjunction with upper carbon anodes. In alternating current lamps it is preferably used as the lower electrode and a carbon used as the upper.

The new electrode consists essentially of the products of such reaction between a chemical compound which, when heated, liberates oxygen, and of some light-giving material capable of combining with the liberated oxygen, as is accompanied by the liberation of heat, whereby the reaction is propagated automatically throughout the mass, when once started at any point, and the exothermic reaction product hardens to a solid coherent body. As the oxygen furnishing materials which may start and propagate the exothermic reaction with the light giving material, I may mention barium peroxid, chromium trioxid and barium nitrate; but other materials containing a great proportion of oxygen which is liberated, when the material is heated, in sufficient quantity to combine with the light giving material so vigorously as to generate sufficient heat to propagate the reaction from point to point, may be used. Such materials may properly be called pyro-oxygenetic materials. As the light giving bodies fit to be reacted upon in this manner by the pyro-oxygenetic bodies, I may mention the carbids of titanium, magnesium, chromium, cerium and barium; also titanium nitrid, carbonitrid, carbon, magnesium, and several sulfids. Among these materials barium peroxid may be looked upon as the characteristic and principal compound which liberates oxygen when heated, and among the light giving materials fit to be used in this manner titanium carbid may be looked upon as the characteristic material and which has been found to be particularly effective.

With these characteristic reacting materials used in accordance with my invention, the resulting electrodes furnish an intense light of a very pale amber color. With the expenditure of about 300 watts (4 amperes and 75-80 volts) I have obtained a mean spherical candle power of 737, which corresponds to a consumption of about .45 watts per mean spherical candle. This result was obtained when the new electrode was used as a lower cathode with an upper anode of copper. The candle power varies with the proportion of the reacting materials used, but the above mentioned result was obtained with electrodes into the composition of which 34% of barium peroxid and 66% of resistance furnace titanium carbid were used.

The new electrodes can be made singly or in bunches, or the new electrode material may be made in bulk, then ground and filled into iron tubes, such as are used in magnetite electrodes.

The accompanying drawing illustrates two general forms which the new electrode may assume and the apparatus which may be used in practice of making them as follows.

Figure 1:
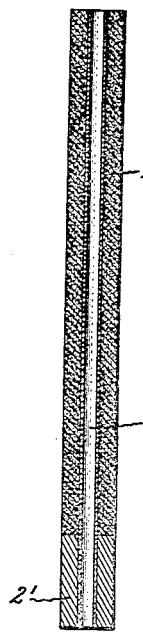
Figure 1 is a longitudinal section of the shell-less form of the new electrode.

The process of making the shell form of the new electrode is as follows:

A mixture of say 34 parts of barium dioxid and 66 parts of titanium carbid is filled into an iron shell 1, (see Fig. 6), such as is used in the well known magnetite electrode, the butt end of which is closed by a thimble 2, and is therein compressed; but the walls of the shell may be much thinner than in the magnetite electrode, about .003" as against .007" in the latter. The upper end of the shell is preferably closed by a disk 3, and this end is then heated to a red heat in any suitable manner as for instance by a Bunsen flame, whereupon the reaction sets in with the liberation of heat, and this exothermic reaction is gradually propagated throughout the whole length of the filling in the shell. The reaction is completed within a few minutes, after which the mass cools down, and when cooled is found to be a hard, solid, self-sustaining body 4, so that the iron shell might be stripped from it, if desired. By preference however the iron shell is retained, or some equivalent of the same, as hereinafter described is supplied. The reason for this is that the reaction product is a poor conductor in the cold state and is sufficiently brittle to break under hard mechanical usage. Therefore the iron shell or its equivalent is used with the reaction product as an integral part of the electrode, so that an arc may be started in the cold state and the breakage of the electrode be prevented. In place of an iron shell an iron core, preferably a tubular core, may be used or a carbon shell with as thin a wall as practicable, or a carbon core may be used, particularly in those cases in which the presence of iron in the finished electrode may be objectionable.

One form of shell-less electrode is represented in Fig. 1, where in place of the thimble 2, the butt end is a short iron cylinder into which the core 5, which may be an iron tube or a solid iron or carbon rod; the drawing shows the core as a tube. The reaction product 4, surrounds and closely fits both the core and the iron cylinder 2'. Electrodes of this general character are conveniently made in molds such as shown in Figs. 3, 4, and 5.

Figure 2:
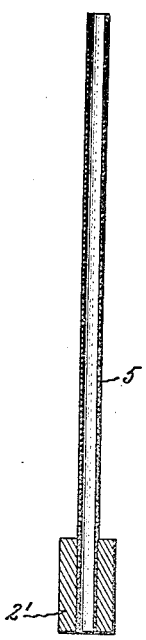
Fig. 2 is a like section of the tubular core and of the butt end of the shell-less form of electrode.
Figure 6:
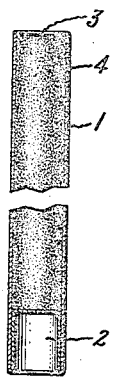
Fig. 6 is a shell form of the electrode.

The mold 6 is composed of two slabs 7, 8, each having a series of semi-circular grooves, 9 equally spaced, so that when the two slabs are fastened together, as by screws 10, there is a series of cylindrical channels 11 passing from end to end. Each of these channels receives a cylinder 2' with a core 5 (separately shown in Fig. 2) as indicated in one of the channels in Figs. 3 and 4. In practice, when a single mold is used, the powdered reacting material is filled into the spaces of the channels left free by the cores and is compacted therein by bumping, in the usual manner of filling electrode shells, and the top of each channel may or may not be closed by a disk, such as is shown in Fig. 6 at 3, and it is of little consequence whether or not the core, if it is tubular as shown, is also filled with the reacting material. The top edge of the mold is then heated as described with reference to Fig. 6 and the reaction proceeds.

When the mold has cooled down it may be opened and the electrodes of the form shown in Fig. 1 are removed.

Figure 3:
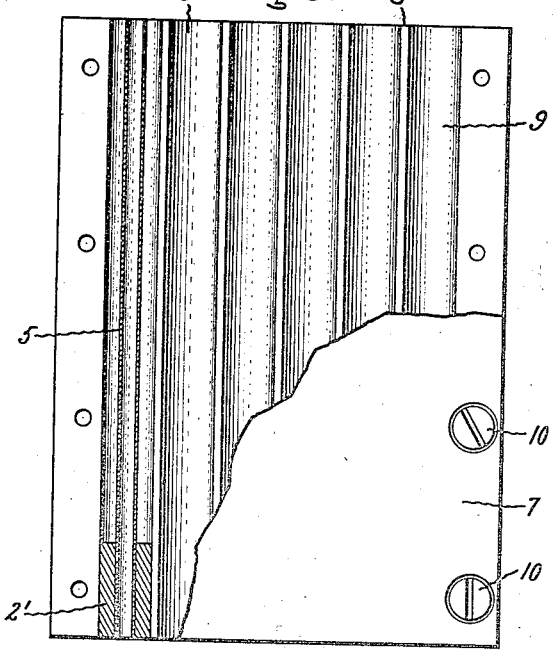
Fig. 3 is an elevation, partly in section, of the mold for making the shell-less form of electrode, with parts broken away to expose the interior of the mold.
Figure 4:
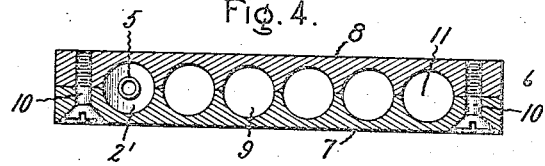
Fig. 4 is a transverse section of the mold.
Figure 5:
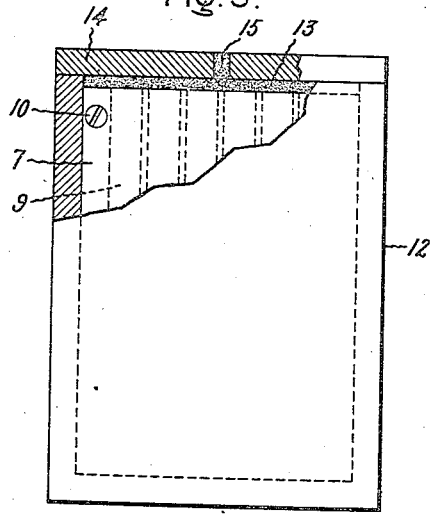
Fig. 5 shows the assemblage of a number of molds arranged preparatory to the reaction process.

Instead of using single molds like those shown in Figs. 3 and 4, a number of them packed closely together in a well fitting box 12, may be used. In that case a small space 13 is left between the tops of the molds and the cover 14 of the box, and this space is filled with the reacting material, as indicated. An opening 15, in the cover, is also filled with the reacting material and the reaction is started by heating the material in the opening; the reaction then propagates itself as hereinbefore described.

It is to be understood that the apparatus herein described by way of example may be modified in many ways without departing from my invention, which is not limited to the use of any particular contrivance for the practice of the process.

The reaction which takes place in the manner described is probably of a complex character and the constitution of the reaction product varies with the materials employed and with the proportion in which they are used; also, the vigor and speed of reaction varies accordingly. When employing 34 parts of technical pure barium dioxid (86.5% pure) and 66 parts of resistance furnace titanium carbid, an analysis of the reaction product resulted in

| | | |
|---|---|---|
| Titanium carbid (TiC) | 59.67 | |
| Barium carbonate (BaCO$_3$) | 11.00 | |
| Barium titanate (BaTiO$_3$) | 27.30 | 30 |
| | 97.97 | 100.67 |

Although great care was observed in the making of this analysis I am not willing to say that it is absolutely correct; and in fact it would be useless to attempt absolute accuracy in a case like this, where the materials employed necessarily differ in composition, more or less, and where the proportion of the materials employed may differ widely without departing from my invention. I have varied the proportions of barium dioxid and titanium carbid between wide limits, and still secured the automatically propagated reaction and in all cases a solid reaction product and a high candle power from the finished electrode was obtained. The rule to be observed is that a sufficient amount of barium dioxid (or its equivalent) must be used to start and propagate the reaction. I have also found that I may use a mixture of oxygen liberating compounds in various proportions and a mixture of various light giving materials which enter into reaction with the oxygen liberating compound or compounds, and I have also found that I may add to these mixtures materials which do not, or apparently do not, enter into the reaction, but the presence of which in the electrode is useful for modifying the color of the light or which enhance the steadiness of the arc. The reacting compounds should preferably be so proportioned that the reaction yields no gases or practically no gases.

While it is desirable and most convenient to produce the reaction compound in a holder such as an iron or carbon tube, which then with its contents constitutes the finished electrode, it is quite practicable to produce the reaction in bulk, say in a crucible, and then powder the material and fill it into tubes like other electrodes as hereinbefore indicated; but reacting *in situ* or in molds is preferable.

What I claim as new and desire to secure by Letters Patent of the United States, is:

1. An arc lamp electrode material consisting of the exothermic reaction product of pyro-oxygenetic and light giving compounds.

2. An arc lamp electrode material consisting of the exothermic reaction product of a compound which, when heated, liberates oxygen, with a light giving material capable of combining with the liberated oxygen.

3. A solid coherent arc lamp electrode material consisting of the exothermic reaction product of a compound which, when heated, liberates oxygen, with a light giving material capable of combining with the liberated oxygen.

4. An arc-lamp electrode material consisting of the exothermic reaction product of barium peroxid with titanium carbid.

5. An arc-lamp electrode composed of the exothermic reaction product of barium peroxid with titanium carbid and a conducting body extending throughout the length of the electrode.

6. An arc-lamp electrode consisting of a conducting tube containing the exothermic reaction product of pyro-genetic and light giving compounds.

7. The process of making arc lamp electrode material, which consists in starting exothermic reaction at one point of a mixture of pyro-genetic and light-giving materials of such composition and proportion that the reaction will propagate from point to point through the whole mass of the mixture, and allowing the mass to cool when the reaction has ceased.

8. The process of making arc-lamp electrodes, which consists in filling a conducting tube with a powdered mixture of barium peroxid and titanium carbid, heating the top of the filled tube until oxygen is liberated from the peroxid and enters into exothermic reaction with the carbid, allowing the reaction to propagate throughout the whole length of the filled tube and then allowing the mass to cool.

In witness whereof, I have hereunto set my hand this ninth day of March, 1916.

KNUT TORNBERG.